United States Patent [19]

Matsumoto et al.

[11] 4,016,471
[45] Apr. 5, 1977

[54] LEVEL DETECTION SYSTEM HAVING A BAND-PASS CHARACTERISTIC AND A SERVO SYSTEM INCLUDING THE SAME

[75] Inventors: Seiichi Matsumoto, Yokohama; Kazuya Hosoe, Machida, both of Japan

[73] Assignee: Canon Kabushiki Kaisha, Tokyo, Japan

[22] Filed: May 6, 1974

[21] Appl. No.: 467,578

[30] Foreign Application Priority Data

May 11, 1973   Japan ................... 48-52217

[52] U.S. Cl. ................... 318/629; 318/606; 318/684; 307/233 R
[51] Int. Cl.² ................... G05B 11/01
[58] Field of Search ........... 318/629, 684, 606; 307/233

[56] References Cited
UNITED STATES PATENTS

| | | | |
|---|---|---|---|
| 3,562,675 | 2/1971 | Urell | 307/233 A |
| 3,577,008 | 5/1971 | Craft | 307/233 A |
| 3,582,679 | 6/1971 | Carp | 307/233 A |
| 3,679,957 | 7/1972 | Farque | 318/629 |
| 3,777,125 | 12/1973 | Whetham | 318/629 |
| 3,808,486 | 4/1974 | Cuda et al. | 318/629 |

Primary Examiner—Robert K. Schaefer
Assistant Examiner—John J. Feldhaus
Attorney, Agent, or Firm—Toren, McGeady and Stanger

[57] ABSTRACT

A level detection system and a servo system employing the level detection system are disclosed. The level detection and servo system employs the use of a reasonably broad band-pass characteristic to avoid criticality in narrow band-pass systems. The level detection system includes an input level comparison circuit responsive to an input signal having a recurrent frequency and a reference signal. A filter having a band-pass characteristic which will pass the recurrent frequency of the input signal and its side-bands is responsive to the input level comparison circuit. The output of the filter is coupled to a second comparison circuit. The second comparison circuit is employed as a control means to drive the servo motor in the servo system.

11 Claims, 7 Drawing Figures

LEVEL DETECTION SYSTEM HAVING A BAND-PASS CHARACTERISTIC AND A SERVO SYSTEM INCLUDING THE SAME

DETAILED EXPLANATION OF THE INVENTION

This invention relates to a level detection system having a band-pass characteristic and to a servo system including the same.

Prior level detection apparatus for use in servo systems or generalized control systems have usually utilized comparison circuits such as difference amplifier circuits, and switching circuits such as Schmitt type circuits. However, the conventional level detection apparatus generally involve the following basic defects. (1) For input signals to be detected which might have noise of high levels, the level detection output might be affected only by the noise components to provide no outputs but error outputs. (2) The level detection circuit when used as a control circuit unavoidably acquires a response characteristic in a range of levels of input signals, or a dead zone, and, in addition, the socaled hysteresis phenomenon causes the thresholds of the dead zone to differ between the base where the level of input signals gradually increases from a lower level to a higher level, and the case where the level of input signals reaches a lower level from a higher level, so that the detection output itself has error components mixed therein. (3) For servo systems of the type in which the driving of a direct current servo motor incorporated therein is controlled by input signals of pulse type, it is impossible to use such a conventional level detection apparatus in a servo control system in which the level of pulse signals is detected to produce an output which powers the servo motor. The main origin of these defects may be considered to be that the conventional level detection circuit in the basic form comprises a difference amplifier circuit, or Schmitt type circuits used as the aforesaid switching and comparison circuit, which thereby provide an inherent dead zone and hysteresis characteristic which unavoidably result particularly in defect 3.

Defect 1 can be eliminated by the use of a conventional filter circuit. But in this case, when input signals are of pulse type, the pulseshape is made ambiguous in passing through the filter circuit so as to give defects. For example, in servo systems of the type described in connection with defect 3 in which the resultant output is used to power a servo motor, the diffusion of pulse signals results in an error operation of the motor. Therefore, the filter circuit must be selected to have a narrow band characteristic. However, such a narrow band filter is expensive and its use in such type servo control system provides an alternative defect that when the frequency of input signal which is selected so as to pass through the filter circuit is caused to vary in itself by some fault or trouble. Accordingly servo system cannot be rendered operative.

Defect 2 can be eliminated by provision of a signal converter circuit inserted between the level detection circuit and the servo motor to convert a pulse signal train to a direct current signal. However, the incorporation of the signal converter circuit requires additional circuits.

Further, the utilization of such conventional level detection apparatus in feedback control applications for servo systems requires that the servo system be selected to have a dynamic characteristic such that the tracking for variation of the position or distance of a target can be effected with a predetermined accuracy over a practically estimated range. However, the existing servo systems are associated with various non-linear factors, and, therefore, their dynamic characteristics are complicated so that as the servo system approaches its balanced state, unstable operations as represented by hunting phenomenon are caused to arise in the servo motor by the output of the level detection apparatus. Furthermore, in servo systems of the type in which alternating signals or modulating signals are used as input signals, and are demodulated to obtain a direct current output, when input signals of a recurrence frequency have higher harmonics such as noise, error outputs result so as to make unstable the operation of the servo system, thereby providing a defect similar to the aforesaid defect 1.

The present invention is adapted to eliminate all of the above-mentioned defects. Accordingly, an object of the invention is to provide a level detection system having a band-pass characteristic. The level detection system of the invention is characterised by the combination of an input level comparison circuit for compraring the level of input signals of an optionally selected recurrence frequency with a regulated input reference level, a maximum level detection circuit having a band-pass characteristic such that the passing rate is the maximum at said recurrence frequency and its sidebands are passed therethrough, and an output level comparison circuit for comparing the output of said detection circuit with an output reference level. These circuit are arranged in such manner that said output level comparison circuit is triggered by the output of said maximum level detection circuit to produce an ouput of saturation characteristic.

Another object of the invention is to provide a level detection system associated with a servo system to impart a desired predetermined performance to the servo system. The level detection system including a comparison circuit portion having a band-pass characteristic by which the noise components present in the input signals are removed to prevent error operation of the servo system which might be otherwise caused thereby.

Still another object of the invention is to provide a control system for use with a servo system of the type in which the input is modulating signals. In order to impart stable and accurate dynamic characteristics to the servo system, a level comparison circuit having a band-pass characteristic is utilized in the control system of the invention to provide output signals of saturation characteristic for controlling the drive amplifier of a servo motor.

Other object of the invention will become apparant from the following detailed description of certain embodiments of the invention. The description is to be taken in conjunction with the accompanying drawings in which.

Figure 1:
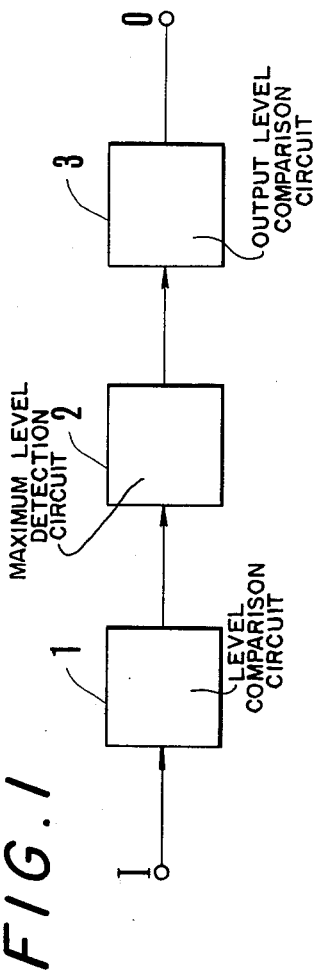
FIG. 1 is a block diagram illustrating a level detection system embodying the principle of the invention.

Referring to FIG. 1, a preferred embodiment of the invention is disclosed in connection with a level detection system. The system comprises an input level comparison circuit 1, a maximum level detection circuit 2 and an output level comparison circuit 3. Pulse signals of an optionally selected recurrence frequency which might have noise components are provided on the input terminal I. The input signals are sent to one of the two input terminals of the level comparison circuit such as a difference amplifier, in which the levels of the input signals are compared with a reference level of potential applied on the other input terminal to provide output signals of the same phase as that of the input signals. The output signals are directed to the maximum level detection circuit 2 having a band-pass characteristic such that the maximum output is produced at the recurrence frequency, fs of the input pulse signals. The output of the circuit 2 is sent to one of the two input terminals of the output level comparison circuit in which the level of the output is compared with a reference level of potential applied on the other input terminal to provide a stable output on the output terminal, 0.

Figure 2:
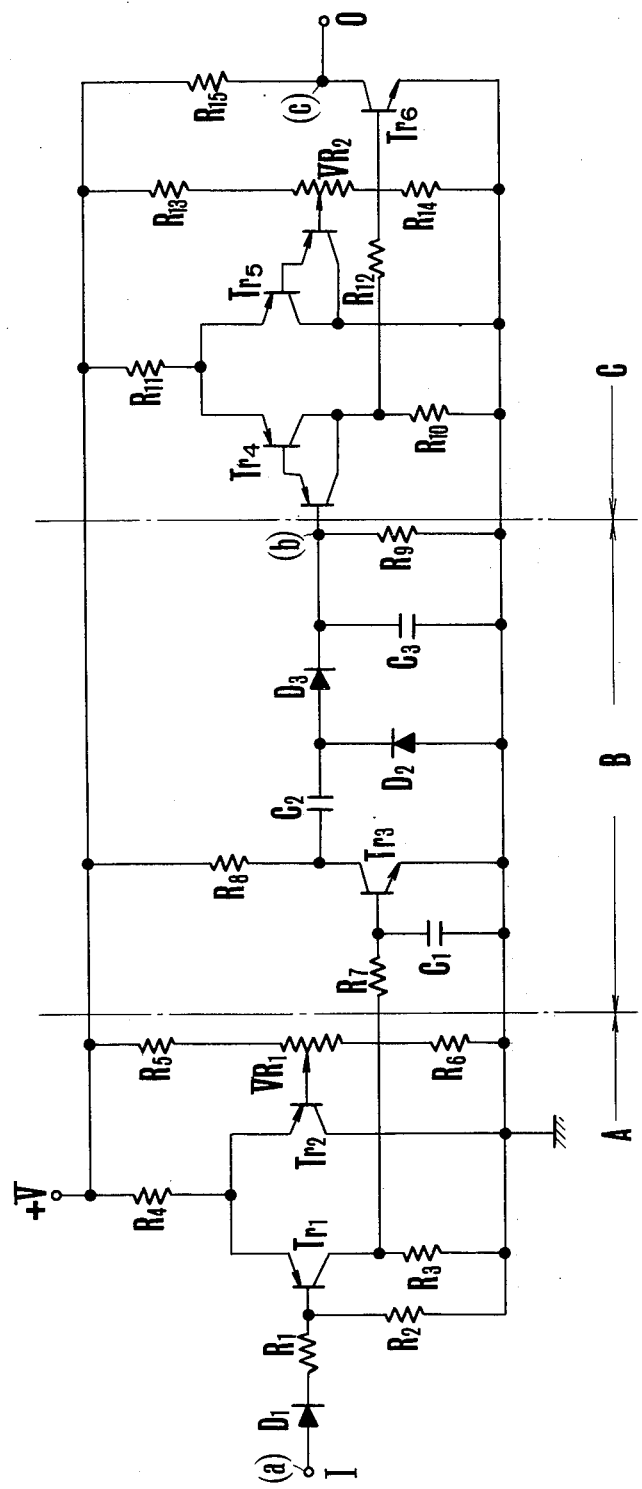
FIG. 2 is a circuit diagram of a practical example of the embodiment of the system of FIG. 1.

In FIG. 2, a level detection circuit constructed in accordance with an embodiment of the invention is illustrated as consisting of three circuit sections A, B and C, the section A corresponding to the input level comparison circuit 1 of FIG. 1, the section B to the maximum level detection circuit and the section C to the output level comparison circuit 3. Pulse signals are provided on an input terminal I and sent through a diode $D_1$ to the base of a transistor $Tr_1$, the base being biased by a resistor $R_2$. The transistor $Tr_1$ constitutes a difference amplifier along with another grounded collector transistor $Tr_2$. The collector of the transistor $Tr_1$ is grounded through a resistor $R_3$ and its emitter electrode is connected through a resistor $R_4$ to a potential source V. The base of the transistor $Tr_2$ is biased by connection to a slidable tap of a potentiometer circuit comprising a variable resistor $VR_1$ and two resistors $R_5$ and $R_6$. The output of the section A produced across the resistor $R_3$ is applied through a time constant circuit comprising a resistor $R_7$ and a condenser $C_1$ to the base of a grounded-emitter NPN transistor $Tr_3$ of section B. Beside the time constant circuit, the section B includes a resistor $R_8$ connected to the collector of transistor $Tr_3$, a clamping circuit comprising a condenser $C_2$ and a diode $D_2$, a time constant circuit comprising a condenser $C_3$ and a resistor $R_9$. The output of the section B produced across the resistor $R_9$ is applied to one of the two base electrodes of a pair of Darlington-connected transistors $Tr_4$ and $Tr_5$ of which the other base electrode is connected to a slidable tap of a potentiometer circuit comprising a variable resistor $VR_2$ and two resistors $R_{13}$ and $R_{14}$, so that a potential of a reference level is applied to the base of Darlington-connected transistors $Tr_5$. The output produced across the resistor $R_{10}$ connected between the collector of Darlington-connected transistors $Tr_4$ and the ground is directed through a resistor $R_{12}$ to the base of a grounded-emitter transistor $Tr_6$ of which the collector electrode is connected to the ouput terminal, 0.

The operation of the circuit of FIG. 2 is as follows. While a positive voltage of a level which is regulated by the potentiometer circuit is applied to the base of the transistor $Tr_2$ of the input level comparison circuit A, a positive pulse signal train of a recurrence frequency entering the input terminal I is directed through a diode $D_1$ to the base of the transistor $Tr_1$. As the amplitude of pulses increases, and the level of potential of the base electrode exceeds the reference potential given to transistor $Tr_2$, the difference amplifier is reversed so that the transistor $Tr_1$ is turned on and the transistor $Tr_2$ is turned off. As the amplitude of the input signal varies, the on-off operation of the difference amplifier is repeated to produce pulse voltages of the same phase as that of the input pulses across the resistor $R_3$ connected between the collector of the transistor $Tr_1$ and the ground. The output voltages are applied through the time constant circuit $(R_7, C_1)$ having a low pass characteristic to the base of transistor $Tr_3$ of the maximum level detection circuit. The ouput of the transistor $Tr_3$ is supplied to a load circuit comprising a condenser $C_2$ and a diode $D_2$ and having a high pass characteristic and is the maximum at the selected recurrence frequency of the input pulse train, and charges the condenser $C_3$ through the diode $D_3$. A suitable selection of the capacitance of the condenser $C_3$ and the resistance of resistor $R_9$ connected to the condenser $C_3$ to discharge the charge stored on the condenser $C_3$ permits the circuit to have a decreasing impedance at an increasing recurrence frequency higher than said recurrence frequency, fs, so that the cut-off frequency at the higher end of the pass band is increased. The pulse signals are integrated in passing through the maximum level detection circuit B to produce a maximum output at the recurrence frequency of input pulse signals. In this case, the maximum level of the output from the circuit section B which is applied to the base of the transistors $Tr_4$ is previously adjusted to a value higher than the dead zone of the difference amplifier circuit comprising the transistors $Tr_4$ and $Tr_5$. That is, the comparison input is set to be the value with which the ouput level of the input comparison amplifying circuit is adapted to be set above the insensitive zone of the output comparison circuit, so that the influence of the insensitive zone in the output comparison circuit can be erased. The output voltage is applied to one of the two bases of high impedance transistors $Tr_4$ and $Tr_5$ in which the level of the output is compared with a reference voltage applied to the other base to produce a comparison output across the resistor $R_{10}$ connected between the collector of the transistors $Tr_4$ and the ground. The comparison output is used for control of the output transistor $Tr_6$ to extract a direct current output from the collector electrode thereof.

Figure 3:
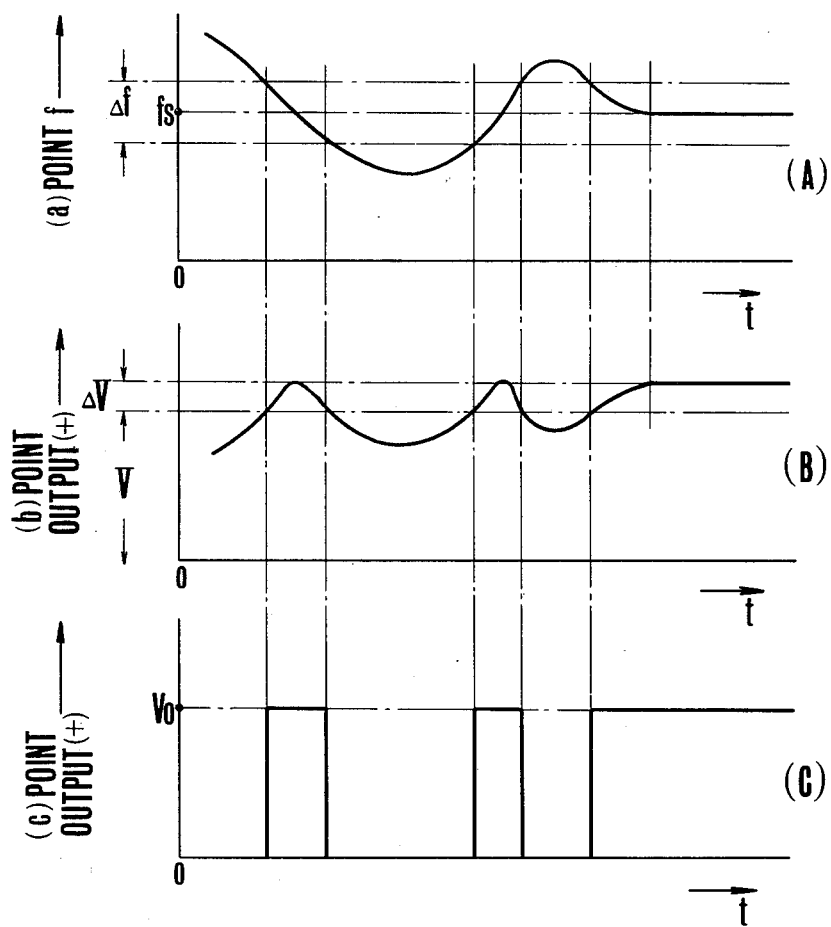
FIG. 3 is a graph illustrating the operating principles of the level detection system of the invention.

In FIG. 3, there are shown curves illustrating the operating principles of the level detection system of the present invention. Curve A is an example of variation with time of the recurrence frequency of input pulse signals entering the input level comparison circuit. The centered frequency is designated by symbol, fs. $\Delta f$ indicates a detectable frequency range. Variation with time of the output voltage from the maximum level detection circuit B is shown at curve B. The ordinate is in voltage. $\Delta V$ indicates a range of variation of the output voltage as the recurrence frequency varies in a range of $\Delta f$. Variation with time of the output voltage from the output level comparison circuit is shown at curve C. Now assuming that the trigger voltage of the output level comparison circuit is V, input signals of frequencies $fs \pm \frac{1}{2}\Delta f$ render operative the output level comparison circuit, so that the collector of the output transistor $Tr_5$ produces an output voltage of Vo in FIG. 3C. As the trigger voltages of the output level comparison circuit approaches the level of $V + \Delta V$, the frequency detection sensitivity of the level detection system increases. The output of the maximum level detection circuit has a level larger than the dead zone inherent to the level comparison circuit, so long as the frequency, $fs$, is varied in a range of $\Delta f$. Therefore, when the output component is in the range, the level comparison circuit is forced to operate. The dead zone can be regulated by varying the resistance of the resistor $VR_2$. Further, even when the input signals entering the input terminal I are of pulse shape, the waveform of the output from terminal, O, can be converted to a wave-form of a direct current of certain level by the use of a filter circuit, so that the output can be used to control the driving of a servo motor.

Figure 4:
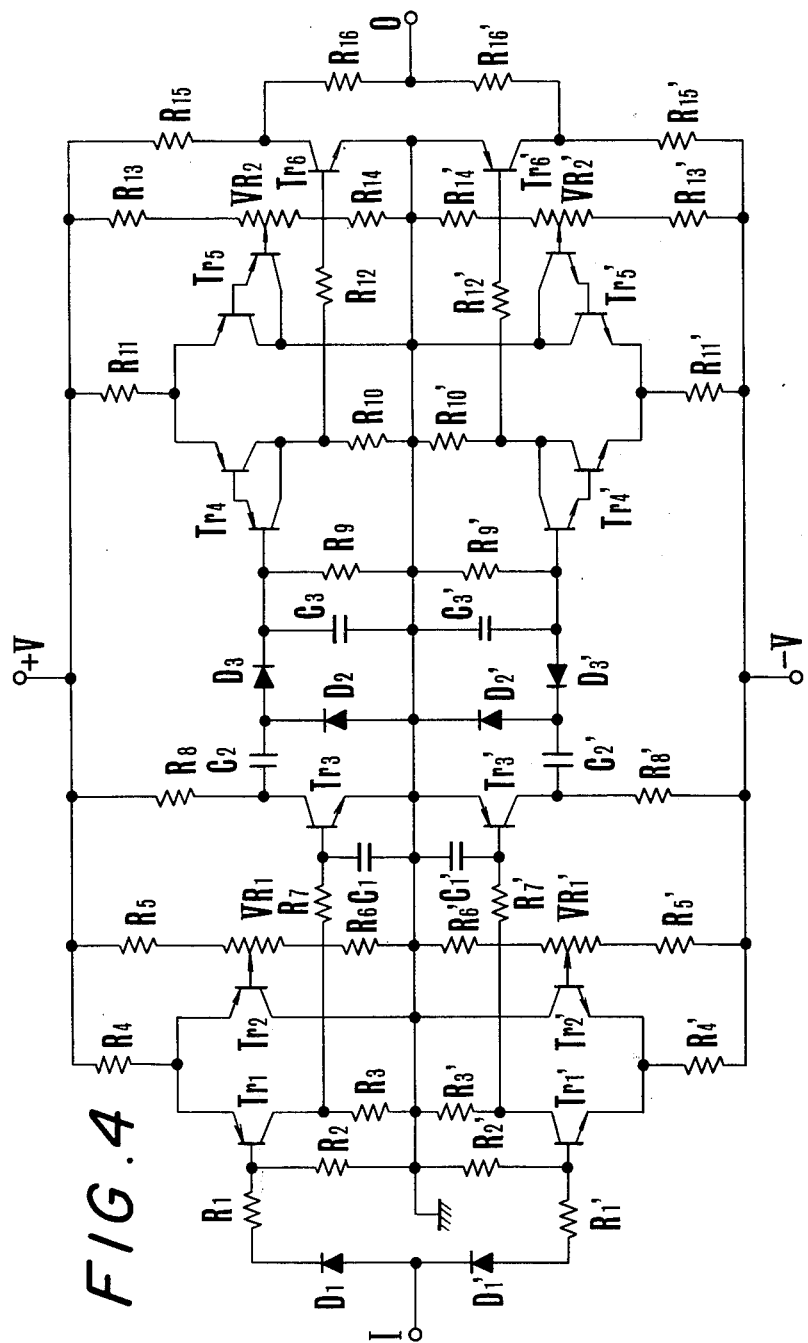
FIG. 4 is a circuit diagram of another example of the embodiment of the level detection system of the invention.

In FIG. 4, there is shown a circuit diagram of another example of the embodiment of the level detection circuit of the invention, in which a pair of the circuits of FIG. 3 are arranged symmetrical of each other with respect to the grounded line, so that the circuit of FIG. 4 is responsive to either of positive and negative polarity input signals. The circuit portion above the grounded line is the same as that of FIG. 3, and is responsive to positive signals, while the circuit portion under the grounded line is responsive to negative signals. The arrangement of the elements of the lower circuit portions is the same as that of the circuit of FIG. 2, but the transistors are of mutually different conductance between the positive and negative circuits, and the directions of the diodes are opposite therebetween. The same elements of the circuit of FIG. 4 as those of the circuit of FIG. 2 have like reference characters. The operation of the circuit of FIG. 4 is the same as that of the circuit FIG. 2.

Figure 5:
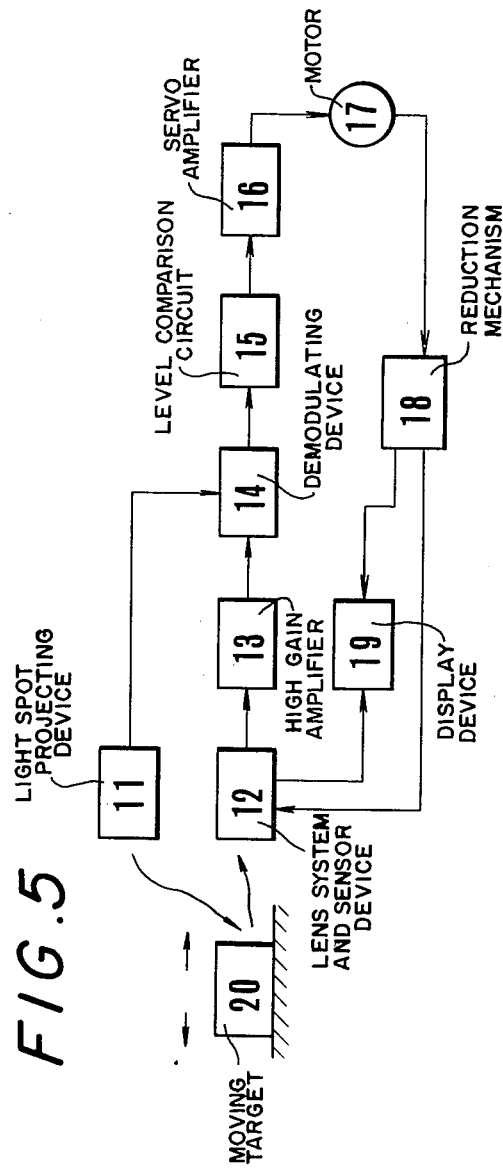
FIG. 5 is a block diagram illustrating a servo system associated with the control system embodying the invention.

Referring now to FIG. 5, there is shown a block diagram of a servo system adapted for use in measuring the distance or position of a target 20 comprises a light-projection device provided with a suitable projection optical system for projecting a light spot on the moving target 20, said light spot being, for example, of modulating light of a certain frequency in a near infrared ray region for the purpose of increasing the S-N ratio with respect to the visible light, a light-receiving device for receiving a beam of light rays emanating from the lightspot projected from the device 11 on the moving target 20, said device 12 comprising a suitable lens system and a sensor having a maximum sensitivity at the near infrared region such as a silicon photovoltaic cell, a high gain amplifier 13 for amplification of the output from the device 12, a demodulating device 14 including a synchronous detector, a level comparison circuit 15 to be subsequently described in detail, a servo amplifier 16 for use in driving a motor, a servo motor 17, a reduction mechanism 18 for reducing the rotation speed of the motor 17, and a display device 19 indicating the detected position or distance of the targent 20. Assuming that the target is positioned in a distance, L, from the light-projection device 11, and the beam of light rays emanating from the light spot projected on the target 20 is received by the light receiving device 12 spaced apart from the light projection device by a distance, D, the deviation, δ, of an image of the light spot focussed on a point near the focal length, $f$, of te light-receiving optical system from the optical axis thereof may be expressed by the following equation.

$$\delta = f \tan\alpha = f \cdot D/L)$$

(wherein $\alpha$ is an angle made by the axes of the projector and receiver optical system intersecting at the light spot)

The distance, L, of the targent is determined by measuring the deviation, δ. The deviation, δ, from the optical axis is detected as a photoelectric output in the light-receiving device, and the output is amplified by the servo amplifier 16 to control the driving of the servo motor 17 in such a way that the deviation, δ, is reduced to zero through the intermediary of the reduction mechanism 18 is connected to the servo motor 17. As the reduction mechanism 18 is connected to the servo motor to be displaceable with reference thereto and in magnitude proportional to the output of the sensor, the display device indicates the determined distance of the targent 20. The direction of movement of the targent 20 can be determined by supplying signals synchronized with modulating light signals from the light-projection device 11 to the synchronous detector 14, so that it is possible to display the distance of the moving targent as tracking the movement thereof.

Figure 6:
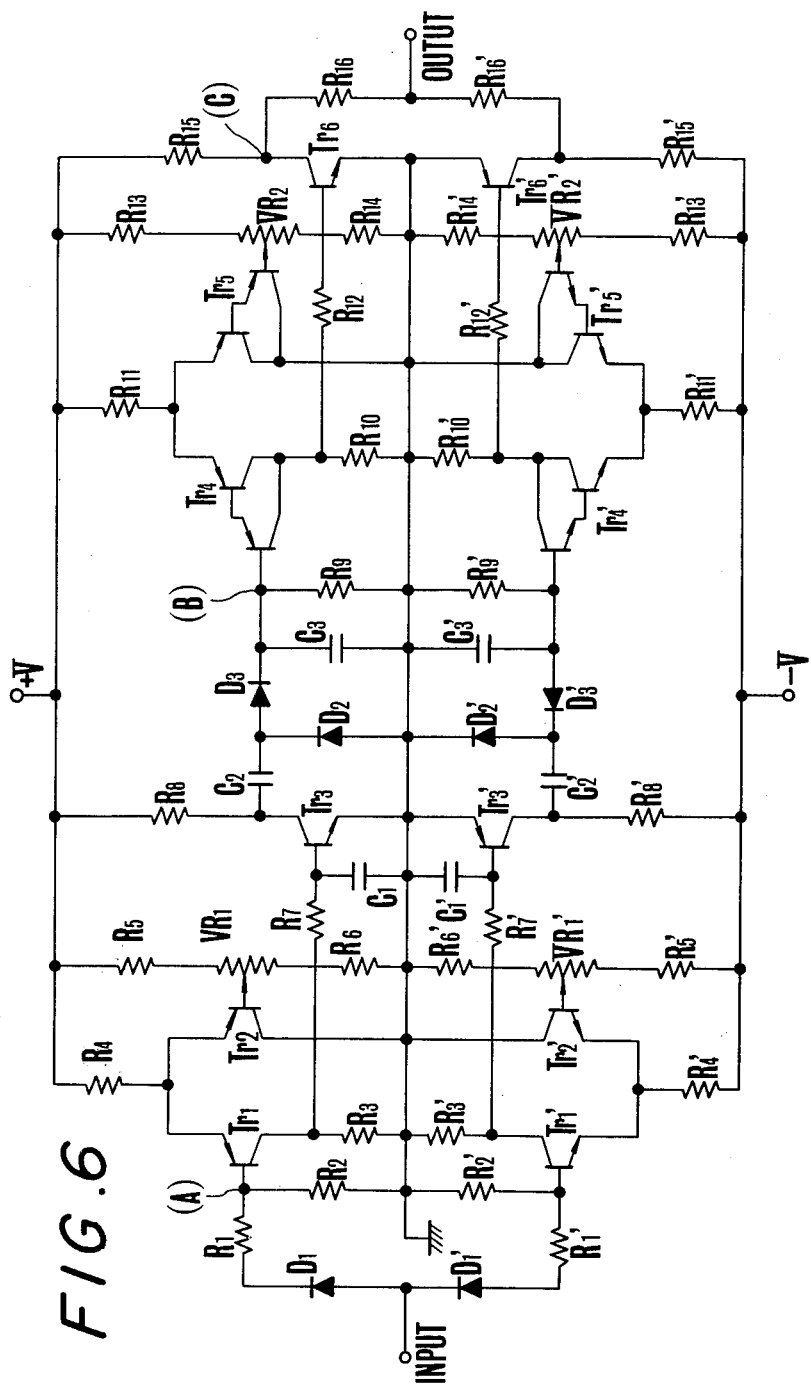
FIG. 6 is a circuit diagram of a practical example of one embodiment of the level comparison circuit of the invention adapted for use with a servo system.

Consideration will be given to the level comparison circuit indicated at block 15 of FIG. 5. A circuit diagram of an example of one embodiment of the level comparison circuit is illustrated in FIG. 6 in which the circuit portion above the grounded line is identical to the circuit portion under the grounded line in the arrangement of the circuit elements, but slightly different in the conductance direction of the transistors and in the orientation of the diodes. The upper circuit portion is responsive to positive input signals, while the lower circuit portion is responsive to negative input signals. Assuming now that positive pulse signals are provided on the input terminal, the signals are directed through the diode $D_1$ to the base of the transistor $Tr_1$ of an input level comparison circuit. Applied on the base of the transistor $Tr_2$ constituting a difference amplifier along with the transistor $Tr_1$ is a potential of a reference level which is regulated by a potentiometer circuit comprising $R_5$, $VR_1$ and $R_6$. In response to input signals having levels larger than the reference level the difference amplifier produces output signals of the same phase as that of the input signals. The output is directed through a circuit comprising $R_7$ and $C_1$ and having a low pass characteristic to the base of the transistor $Tr_3$ of a maximum level detection circuit. Connected to the collector of transistor $Tr_3$ is a circuit comprising $C_2$, $C_3$, $D_2$ and $D_3$ and having a high pass characteristic. These low pass and high pass circuits permit the circuit of transistor $Tr_3$ to function as a maximum level detection circuit having a band-pass characteristic and which produces the maximum output at the frequency of the input signals. In other words, responsive to the input signal frequency and its side-bands, the maximum level detection circuit produces a direct current output between the both terminals of the condenser $C_3$. The output is applied to the base of transistors $Tr_4$ constituting together with transistors $Tr_5$ a high input impedance difference amplifier circuit having an input impedance almost equal to the output impedance of the maximum level detection circuit. Applied to the base of the other transistor $Tr_5$ is a potential of a reference level which is regulated by a potentiometer circuit cmprising $R_{13}$, $VR_2$ and $R_{14}$. When the output level comparison circuit has a blind bandwidth smaller than the level of the direct current output produced across the condenser $C_3$, the output level comparison circuit is triggered by the direct current output to produce an output which is then directed to the transistor $Tr_6$. The output of the transistor $Tr_6$ is taken out from the output terminal.

Figure 7:
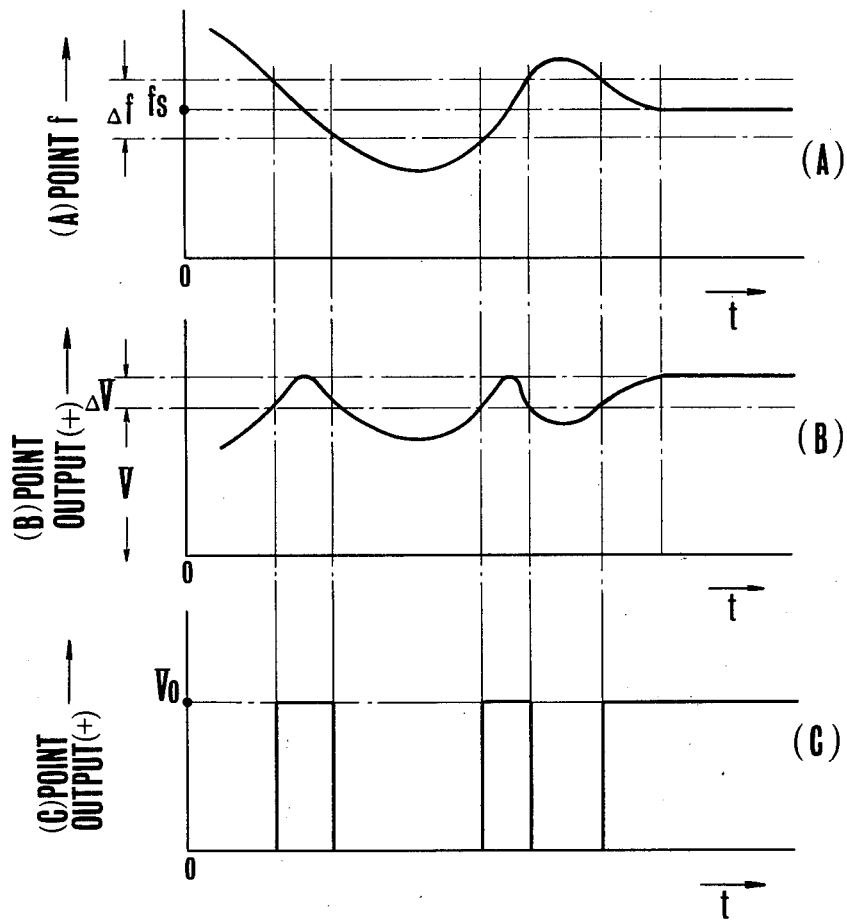
FIG. 7 is a graph illustrating the operating principles of the level comparison circuit of the invention.

The operating principles of the circuit of FIG. 6 are illustrated in FIG. 7 in which the abscissae are in time and the ordinates are in frequency for FIG. 7A and in voltage for FIGS. 7B and 7C, these curves A, B and C occurring at points (A), (B) and (C) in the FIG. 7 respectively. As the frequency at point (A) is varied as indicated at curve A, the voltage at point (B) is varied as indicated at curve B, and the direct current at the output terminals (C) of the output level comparison circuit is varied as indicated at curve C. The flat level output is used to power the servo motor 16.

As mentioned above, the level comparison circuit 15 is triggered by repeated positive or negative pulses which are outputs of the synchronous detector circuit 14 to produce an output of saturation characteristic such as direct current of a certain level. Therefore, the servo amplifier 16 connected to the circuit 15 powers the servo motor with constant output. In other words, the servo motor which is a load of the servo system is driven to rotation at a constant speed, thereby the transmission lag of the servo system is reduced. The reduction of the transmission lag results in, decreases of the hysteresis and static friction, for example, due to the back rush of the gears of the reduction mechanism 18. Further a suitable response speed can be established by increasing the modulating frequency of signals and decreasing the time constant of the time constant circuit for integrating the output of the synchronous detector 14. As the movement of the targent 20 is rapid, a fast response time is required in the servo system to permit the distance measuring device to track the movement of the targent. The system of the invention can meet such a requirement. In general, the reflected light rays from the tangent 20 includes noise as well as modulating signals. As a result, a noise component is present in the output of the synchronous detector in a considerable proportion. According to the invention, the noise component can be eliminated by setting the level comparison circuit to an operative condition where the detection voltage is the maximum at the frequency of the modulating signal light. In addition, the level comparison circuit 15 has an optionally present trigger level, so that the level comparison circuit is not made operative until the amplitude of the repeated input voltage of the level comparison circuit 15 exceeds the predetermined reference level dependent upon the trigger level. The provision of the inoperative range imparts a dead zone to the servo system, the width of the dead zone being dependent upon the resistances of variable resistors $VR_1$, $VR_2$, $VR_1$, and $VR_2$, of FIG. 6. In the servo system having no dead zone, it is necessary to use particular compensating means, or otherwise the probability of effecting unstable operation such as hunting is increased although the offset error is small. Conversely, as the dead zone increases, the probablity of effecting the unstable operation is decreased with increase in offset error, so that the accuracy of the system is decreased. Therefore, the servo system associated with the level comparison circuit of the invention in which the dead zone can be adjusted to the optimum value has a reliable and accurate performance with fast response time.

What is claimed is:

1. A servo control system of the type in which a signal of a recurrence frequency from an input circuit, such as a modulating signal after being demodulated to obtain a signal of the same recurrence frequency is supplied to a servo system including a servo motor, thereupon said servo system being made operative, said servo control system comprising: a level comparison circuit having an input to receive said recurrence frequency signal and reference signal and also having an output;

wide-band filter means coupled electrically to the output of the comparison circuit, the filter means having a characteristic for passing therethrough a signal of the recurrence frequency and its sideband frequencies;

control circuit means coupled to the filter means for producing a control signal for regulating the servo motor, the circuit means having an output of a predetermined saturation characteristic;

whereby the signal from the comparison circuit is changed through the filter means into the control signal for regulating the motor.

2. A servo control system according to claim 1, wherein said level comparison circuit comprises a pair of filter and comparison circuits having semi-conductor elements, and the semi-conductor elements in each of the pairs are of mutually different conductance.

3. A servo control system according to claim 2, wherein said level comparison circuit is provided with a pair of reference level signal producing means, connected to the second input terminals of said comparison circuits of which the first input terminals are connected to the filter circuits, said reference level signal producing means being provided with reference level regulating variable resistance elements connected thereto upon regulation to adjust the dead zone of said comparison circuits.

4. A servo control system according to claim 2, wherein each of said comparison circuits includes a pair of Darlington type circuits and adjustable bias means, one of the input terminals being connected to the output terminal of the filter circuit, and the other input terminal being connected to the adjustable bias means.

5. The servo control system as in claim 1 wherein said level comparison circuit includes:

an output level comparison circuit having a first input terminal on which input signals having an optional recurrence frequency are provided and having a second input terminal on which reference signals having a regulated level are provided;

a maximum level detection circuit having a band-pass characteristic and in which the passing rate is maximum at said recurrence frequency and having its frequency sidebands permitted to pass therethrough;

and an output control circuit having a first input terminal connected to an output terminal of said level detection circuit, said output control circuit being triggered by the output of the maximum level detection circuit to produce an output having a saturation characteristic.

6. The servo control system as in claim 5 wherein said output control circuit of said level comparison circuit includes a further comparison circuit provided with a reference level signal producing circuit connected to the second input terminal of said further comparison circuit of which the first input terminal is connected to the output of said maximum level detection circuit upon application of the maximum output on the first input terminal to eliminate the dead zone of the comparison circuit.

7. The servo control system as in claim 5 wherein said input level comparison circuit, said maximum level detection circuit and said output circuit each are provided in paired form so as to be responsive to either of positive or negative polarity signals.

8. A servo control system according to claim 1 wherein the level comparison circuit comprises two inputs and a potentiometer means which is coupled with one input for applying a reference voltage signal to that input, the voltage level being adjusted above a dead zone level of the control circuit means.

9. A servo control system of the type in which a signal of a recurrence frequency is sent to a servo system for rendering said system effective, the servo control system comprising:
   a level detection circuit to receive said signal of recurrence frequency for detecting deviation from the reference level and to provide a deviation signal;
   a comparison circuit having two inputs, to one of which being applied the deviation signal, the comparison circuit further including a reference signal generating circuit coupled to the other input;
   filter means responsive to the comparison circuit, having a characteristic of passing therethrough a signal of the recurrence frequency and its side band frequencies, said filter having the maximum pass characteristic for the recurrence frequency;
   a second comparison circuit having two inputs, to one of which is applied a signal from the filter means;
   control circuit means connecting the servo motor with the second comparison circuit whereby the motor is regulated without the dead zone effect of the second comparison circuit.

10. A servo control system of the type in which a signal of a recurrence frequency is applied to a servo system, the system comprising:
    a level detection circuit to receive said signal of a recurrence frequency for detecting the deviation from the reference level and to form an output corresponding to the deviation from said reference level;
    a pair of comparison circuits, the comparison circuits having semiconductive means of different conductive type, and having two inputs, to one of which is applied the output of level detection circuit, the comparison circuit further including a reference signal generating circuit connected with the other input;
    a pair of filter means, each of which has a characteristic of passing therethrough a signal of the recurrence frequency and its side band frequencies;
    a pair of second comparison circuits, each of said second comparison circuit having two imputs, to one of which is connected said one of filter means, the comparison circuit further including a reference signal generating circuit connected to the other input; and
    control circuit means connected to the pair of filter means for regulating the servo system, whereby the servo system is adjusted by the signal of substantially the same recurrence frequency.

11. A system according to claim 10, in which said filter means has the maximum pass characteristic for the signal of the recurrence frequency.

* * * * *

UNITED STATES PATENT OFFICE
CERTIFICATE OF CORRECTION

Patent No. 4,016,471     Dated April 5, 1977

Inventor(s) Seiichi Matsumoto et al

It is certified that error appears in the above-identified patent and that said Letters Patent are hereby corrected as shown below:

In the heading of the patent [30] should read as follows.

-- [30] Foreign Application Priority Data

May 11, 1973   Japan.........48-52217
   May 14, 1973   Japan.........48-53295--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*